(12) United States Patent
Murakami et al.

(10) Patent No.: US 8,527,759 B2
(45) Date of Patent: Sep. 3, 2013

(54) IMS USER EQUIPMENT, CONTROL METHOD THEREOF, HOST DEVICE, AND CONTROL METHOD THEREOF

(75) Inventors: Shingo Murakami, Yokohama Kanagawa (JP); Toshikane Oda, Shibuya-ku Tokyo (JP); Luis Barriga, Skarpnäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 360 days.

(21) Appl. No.: 12/989,587

(22) PCT Filed: May 23, 2008

(86) PCT No.: PCT/JP2008/059951
§ 371 (c)(1),
(2), (4) Date: Oct. 25, 2010

(87) PCT Pub. No.: WO2009/141919
PCT Pub. Date: Nov. 26, 2009

(65) Prior Publication Data
US 2011/0055565 A1    Mar. 3, 2011

(51) Int. Cl.
*H04L 9/32* (2006.01)
*H04L 9/08* (2006.01)
*G06F 7/04* (2006.01)
*G06F 17/30* (2006.01)
*H04N 7/16* (2011.01)

(52) U.S. Cl.
USPC ........... 713/168; 713/151; 713/153; 713/161; 380/278; 726/29

(58) Field of Classification Search
USPC ....................................................... 713/150
See application file for complete search history.

(56) References Cited

U.S. PATENT DOCUMENTS 8,239,551 B2 *   8/2012  Oda et al. .................. 709/228
8,285,983 B2 *  10/2012  Hallenstal et al. .......... 713/151
(Continued)

FOREIGN PATENT DOCUMENTS

GB    2419774 A    5/2006
JP    2003-125352 A    4/2003
(Continued)

OTHER PUBLICATIONS

International Search Report, PCT Application No. PCT/JP2008/059951, Jul. 1, 2008.

(Continued)

*Primary Examiner* — Carolyn B Kosowski
(74) *Attorney, Agent, or Firm* — Myers Bigel Sibley & Sajovec, P.A.

(57) ABSTRACT

An IMS User Equipment (UE) is provided. The IMS UE comprises: searching means for searching, based on UPnP technology, a UPnP network for a host device that has IMS subscription information, establishing means for establishing a session with the host device discovered by the searching means, subscription retrieving means for retrieving, from the host device via the session, the IMS subscription information, registering means for registering with the IMS network using the IMS subscription information, key retrieving means for retrieving, from the host device via the session, a first encryption key shared with an IMS application server (AS) in an IMS network by sending identity of the IMS AS to the host device via the session, and communicating means for performing encrypted communication with the IMS AS using the first encryption key.

20 Claims, 14 Drawing Sheets

(56) References Cited

U.S. PATENT DOCUMENTS

| | | |
|---|---|---|
| 2006/0230436 A1 | 10/2006 | Holtmanns et al. |
| 2007/0143614 A1* | 6/2007 | Holtmanns et al. ........... 713/171 |
| 2007/0195805 A1 | 8/2007 | Lindgren |
| 2008/0141313 A1* | 6/2008 | Kato et al. ...................... 725/62 |
| 2008/0273704 A1* | 11/2008 | Norrman et al. ............. 380/278 |
| 2009/0172397 A1* | 7/2009 | Kim ............................... 713/168 |
| 2009/0180484 A1* | 7/2009 | Igarashi ........................ 370/401 |
| 2009/0282236 A1* | 11/2009 | Hallenstal et al. ............ 713/151 |
| 2010/0030904 A1* | 2/2010 | Oda et al. ..................... 709/228 |
| 2010/0049980 A1* | 2/2010 | Barriga et al. ................ 713/171 |
| 2010/0070636 A1* | 3/2010 | Skog et al. .................... 709/228 |
| 2010/0177769 A1* | 7/2010 | Barriga et al. ................ 370/352 |
| 2010/0181373 A1* | 7/2010 | Murakami et al. ........... 235/375 |
| 2010/0223339 A1* | 9/2010 | Cheng et al. .................. 709/206 |
| 2010/0281262 A1* | 11/2010 | Cheng et al. .................. 713/171 |
| 2011/0010768 A1* | 1/2011 | Barriga et al. .................. 726/11 |
| 2011/0026510 A1* | 2/2011 | Matsumura et al. .......... 370/338 |
| 2011/0029777 A1* | 2/2011 | Murakami et al. ............ 713/171 |
| 2011/0055565 A1* | 3/2011 | Murakami et al. ............ 713/168 |
| 2011/0055567 A1* | 3/2011 | Sundaram et al. ............ 713/169 |
| 2011/0107436 A1* | 5/2011 | Cholas et al. .................... 726/29 |
| 2011/0138413 A1* | 6/2011 | Hjelm et al. ...................... 725/34 |
| 2011/0167160 A1* | 7/2011 | Murakami et al. ............ 709/227 |
| 2011/0170694 A1* | 7/2011 | Brusilovsky et al. ......... 380/278 |
| 2011/0188508 A1* | 8/2011 | Hjelm et al. .................. 370/401 |
| 2011/0219229 A1* | 9/2011 | Cholas et al. .................. 713/168 |
| 2011/0243113 A1* | 10/2011 | Hjelm et al. .................. 370/338 |
| 2011/0246624 A1* | 10/2011 | Kato et al. ..................... 709/219 |
| 2011/0277015 A1* | 11/2011 | Murakami ......................... 726/3 |
| 2012/0011222 A1* | 1/2012 | Yasukawa et al. ............ 709/217 |
| 2012/0011368 A1* | 1/2012 | Zhu et al. ...................... 713/171 |
| 2012/0016987 A1* | 1/2012 | Oda et al. ...................... 709/224 |
| 2012/0059897 A1* | 3/2012 | Barriga et al. ................ 709/206 |
| 2012/0117192 A1* | 5/2012 | Gerdes et al. ................. 709/217 |
| 2012/0246480 A1* | 9/2012 | Selander et al. .............. 713/168 |
| 2012/0265889 A1* | 10/2012 | Skog et al. .................... 709/228 |

FOREIGN PATENT DOCUMENTS

| | | |
|---|---|---|
| JP | 2003-324768 A | 11/2003 |
| WO | WO 2006/045706 A1 | 5/2006 |
| WO | WO 2006/109122 A1 | 10/2006 |
| WO | WO 2007/062882 A2 | 6/2007 |
| WO | WO 2007/131548 A1 | 11/2007 |
| WO | WO 2008/054270 A1 | 5/2008 |
| WO | WO 2008/068963 A1 | 6/2008 |

OTHER PUBLICATIONS

International Preliminary Report on Patentability; PCT/JP2008/059951; May 25, 2010.

Dempo et al., "Personal Area Network Support in an All-IP Network", Proceedings of the 2005 IEICE Communications Society Conference, The Institute of Electronics, Information and Communication Engineers, Sep. 7, 2005, pp. S-19 to S-20.

Peter Howard, "AKA Usage in 3GPP", [online] 3GPP TSG SA WG3 Security S3#34, 2004[retrieved on Jun. 19, 2008], URL:http://www.3gpp.org/ftp/TSG_SA/WG3_Security/TSGS3_34_Acapulco/Docs/PDF/S3-040645.pdf; 23 pages.

Johansson, "Converging Requirements on the Residential Gateway", [online], 2005[retrieved on Jun. 19, 2008], URL:http://www.iec.org/events/2005/bbwf/pdfs/g2_rolf_johansson_ericsson.pdf, 19 pages.

* cited by examiner

IMS USER EQUIPMENT, CONTROL METHOD THEREOF, HOST DEVICE, AND CONTROL METHOD THEREOF

CROSS REFERENCE TO RELATED APPLICATION

This application is a 35 U.S.C. §371 national stage application of PCT International Application No. PCT/JP2008/059951, filed on 23 May 2008, the disclosure and content of which is incorporated by reference herein in its entirety. The above-referenced PCT International Application was published in the English language as International Publication No. WO 2009/141919 A1 on 26 Nov. 2009.

TECHNICAL FIELD

The present invention generally relates to an IP Multimedia Subsystem (IMS) User Equipment (UE), a method for controlling the IMS UE, a host device, and a method for controlling the host device. The present invention particularly relates, but is not limited to, a technology that enables the IMS UE to utilize IMS subscription information managed by another device such as the host device.

BACKGROUND

A network architecture called "IP Multimedia Subsystem" (IMS) has been developed by the 3rd Generation Partnership Project (3GPP) as an open standard for handling multimedia services and sessions in the packet domain.

An IMS Subscriber Identity Module (ISIM) application, or alternatively a Universal Subscriber Identity Module (USIM), stored in a Universal Integrated Circuit Card (UICC) is indispensable to an IMS UE because it contains subscription information that is necessary for the IMS UE to access an IMS network and receive various IMS-based services. The subscription information includes, for example, user identity information such as an IMS Private User Identity (IMPI) and an IMS Public User Identity (IMPU), credentials, and so on.

Taking an IPTV system as an example, any IPTV Terminal Function (ITF), such as a Set Top Box (STB) or TV-set, is required to be authenticated by the IMS network and IPTV system with an ISIM in order to receive IPTV services.

However, not all IMS UEs are necessarily equipped with a UICC. An IMS UE without a UICC must obtain subscription information by some other means in order to access the IMS network. Moreover, it is sometimes desirable even for an IMS UE with a UICC to externally obtain subscription information because the user of the IMS UE may be different from the owner of its UICC. Therefore, a technology for remote ISIM access, that is, a technology that enables the IMS UE to utilize the ISIM of another device, is required.

As of today, several prior art references are known which provide mechanisms, use cases, or service requirements for remote SIM/ISIM access technology as follows:

The 3rd Generation Partnership Project (3GPP) TSG SA WG3 discussed several different models and scenarios where IMS access capabilities are split into two entities, a device like a PC connected to a fixed IP network and a UMTS UE with a UICC. For example, IMS functionality on a PC and ISIM (or USIM) stored in the UICC of the UMTS UE are linked through some interface so that the PC and the UMTS UE can cooperatively act as an IMS UE with the UICC.

A feasibility study was conducted in 3GPP TR 33.817 that presents issues, security threats, potential requirements and the like in an environment where a SIM application is re-used by peripheral devices such as laptop computers or PDAs to be authenticated to mobile operators so that the peripheral devices can access 3GPP and WLAN networks that the mobile operators provide.

The Fixed Mobile Convergence Alliance (FMCA) gives the service requirements for a SIM Access and Authentication service where a SIM in a mobile handset is being used as an authentication token on other user devices for the fixed-mobile convergence environment defined by the FMCA.

A Bluetooth SIM Access Profile provides a means to allow devices such as car phones with built in GSM transceivers to connect to a SIM card in a phone with Bluetooth, so the car phone itself doesn't require a separate SIM card.

Problems with Existing Solutions

In order to realize remote ISIM access, some mechanism in the local environment is eventually required to dynamically discover an available ISIM (or USIM) application and to pair up the discovered ISIM application with the IMS UE. However, none of the prior art references offer a complete and detailed solution for providing such mechanisms.

The Bluetooth SIM Access Profile could be one solution for realizing remote ISIM access; however, it is difficult to mandate that all home user devices be equipped with Bluetooth adapters given the lack of availability of Bluetooth-equipped user devices in the present market relative to Ethernet or WLAN.

Moreover, none of the prior art references provide a specific technology to efficiently realize encrypted communication between the IMS UE and an IMS AS when the IMS UE utilizes subscription information maintained by another device.

SUMMARY

The present invention is intended to address the above-described problem, and it is a feature thereof to introduce a new technology that enables an IMS UE to utilize subscription information maintained by another device. This is achieved by the equipment, methods, and device according to the appended independent claims, and by the embodiments according to the dependent claims.

According to a first aspect of the present invention there is provided an IMS User Equipment (UE). The IMS UE comprises: searching means for searching, based on UPnP technology, a UPnP network for a host device that has IMS subscription information, establishing means for establishing a session with the host device discovered by the searching means, subscription retrieving means for retrieving, from the host device via the session, the IMS subscription information, registering means for registering with the IMS network using the IMS subscription information, key retrieving means for retrieving, from the host device via the session, a first encryption key shared with an IMS application server (AS) in an IMS network by sending identity of the IMS AS to the host device via the session, and communicating means for performing encrypted communication with the IMS AS using the first encryption key.

In some embodiments, the communicating means receives, from the IMS AS, content encrypted by use of a second encryption key and the second encryption key encrypted by use of the first encryption key, and the IMS UE further comprises: key decrypting means for decrypting the encrypted second encryption key by use of the first encryption key, and content decrypting means for decrypting the encrypted content by use of the second encryption key. The second encryption key may be MBMS Traffic Key (MTK).

In some embodiments, the establishing means receives identity of a key server from the host device, receives a third encryption key shared with the host device from the key server, and encrypts the session by use of the third encryption key. The third key may be Ks_local_device.

According to a second aspect of the present invention there is provided a method for controlling an IMS User Equipment (UE). The method comprises: searching, based on UPnP technology, a UPnP network for a host device that has IMS subscription information, establishing a session with the host device discovered in the step of searching, retrieving, from the host device via the session, the IMS subscription information, registering with the IMS network using the IMS subscription information, retrieving, from the host device via the session, a first encryption key shared with an IMS application server (AS) in an IMS network by sending identity of the IMS AS to the host device via the session, and performing encrypted communication with the IMS AS using the first encryption key.

In some embodiments, the step of performing receives, from the IMS AS, content encrypted by use of a second encryption key and the second encryption key encrypted by use of the first encryption key, and the method further comprises: decrypting the encrypted second encryption key by use of the first encryption key, and decrypting the encrypted content by use of the second encryption key. The second encryption key may be MBMS Traffic Key (MTK).

In some embodiments, the step of establishing receives identity of a key server from the host device, receives a third encryption key shared with the host device from the key server, and encrypts the session by use of the third encryption key. The third key may be Ks_local_device.

According to a third aspect of the present invention there is provided a host device. The host device comprises: establishing means for establishing a session with an IMS User Equipment (UE) based on UPnP technology, subscription retrieving means for retrieving IMS subscription information from a memory, subscription sending means for sending the IMS subscription information to the IMS UE via the session, key retrieving means for retrieving a first encryption key shared with an IMS application server (AS) in an IMS network based on identity of the IMS AS received from the IMS UE via the session, and key sending means for sending the first encryption key to the IMS UE via the session.

In some embodiments, the key retrieving means comprises: bootstrapping means for creating a master key shared with a Bootstrapping Server Function (BSF), and calculating means for calculating the first encryption key based on the master key and the identity of the IMS AS. The master key may be Ks.

In some embodiments, the establishing means sends identity of a key server to the IMS UE, calculates a second encryption key shared with the IMS UE based on the identity of the key server, and encrypts the session by use of the second encryption key. The second key may be Ks_local_device.

According to a fourth aspect of the present invention there is provided a method for controlling a host device. The method comprises: establishing a session with an IMS User Equipment (UE) based on UPnP technology, retrieving IMS subscription information from a memory, sending the IMS subscription information to the IMS UE via the session, retrieving a first encryption key shared with an IMS application server (AS) in an IMS network based on identity of the IMS AS received from the IMS UE via the session, and sending the first encryption key to the IMS UE via the session.

In some embodiments, the step of retrieving the first encryption key comprises: creating a master key shared with a Bootstrapping Server Function (BSF), and calculating the first encryption key based on the master key and the identity of the IMS AS. The master key may be Ks.

In some embodiments, the step of establishing sends identity of a key server to the IMS UE, calculates a second encryption key shared with the IMS UE based on the identity of the key server, and encrypts the session by use of the second encryption key. The second key may be Ks_local_device.

The main advantage of the present invention is as follows. The user is relieved from the burden of inserting their own UICC into the IMS UE because the IMS UE can dynamically discover an available host device that has IMS subscription information (in other words, an available host device that has an ISIM or USIM application) in the UPnP network, and receive IMS-based services by use of the IMS subscription information managed by the host device. Moreover, the present invention is useful in that the IMS UE can efficiently obtain the encryption key used for encrypted communication in connection with the IMS-based services.

Further features of the present invention will become apparent from the following description of exemplary embodiments with reference to the attached drawings, in which like reference characters designate the same or similar parts throughout the figures thereof.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

In the following description, an IPTV service, an ITF, and an IPTV AS are employed in an example of an IMS-based service, an IMS UE, and an IMS AS. However, the present invention can be applied for any kind of IMS-based services and corresponding IMS UEs and IMS ASs. Moreover, although an ISIM is described as a source of IMS subscription information, the present invention can be applied for the case where a USIM is used instead of the ISIM.

Figure 1:
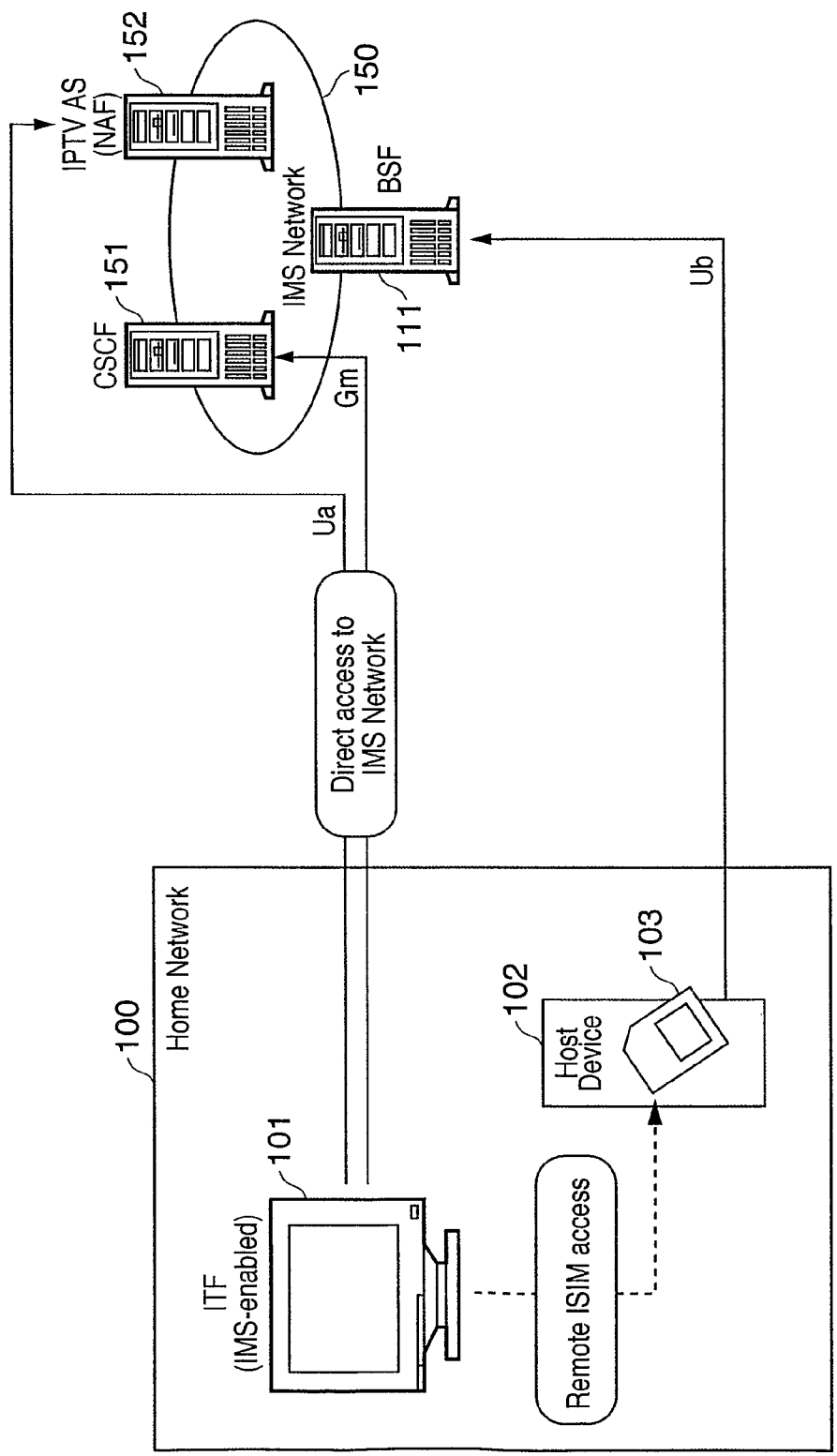
FIG. 1 shows an overview of the present invention.

FIG. 1 shows an overview of the present invention. A home network 100 is a communication network based on a UPnP technology. The home network 100 comprises an ITF 101 and a host device 102 that is equipped with a UICC 103. Although it is assumed that ISIM (or USIM) is implemented in the UICC 103 that is physically inserted to the host device, such identity modules may be implemented in another form. For example, an ISIM (or USIM) may be realized as a remotely managed software object that is downloadable via network to a trusted execution environment of the host device 102, or it may be implemented in an embedded chip (also called Industrial Form Factor) within the host device 102, also possibly remotely managed.

An IMS network 150 comprises a call session control function (CSCF) 151 and an IPTV AS 152 that is a kind of a network application function (NAF). The IMS network 150 also comprises a Home Subscriber Server (HSS) (not shown). There is also a bootstrapping server function (BSF) 111 that can be accessed from the host device.

Because the ITF 101 is equipped with IMS functionality, it can make direct communication with IMS network 150 via the standard Gm and Ua interfaces as long as it has IMS subscription information such as an IMPI and IMPU. However, in the present embodiment, the ITF 101 does not have a UICC, or it does have a UICC but shall not use its own UICC for some reason. Accordingly, the ITF 101 retrieves the IMS subscription information maintained in the UICC 103 from the host device 102.

The host device 102 may be any kind of devices as long as it can provide the ITF 101 with IMS subscription information. For example, the host device 102 may be a dedicated server, a mobile phone, a Home IMS Gateway (HIGA) as disclosed in WO 2006/045706, or the like. The host device 102 may even be an ITF which itself accesses the CSCF 151 and the IPTV AS 152.

Figure 2:
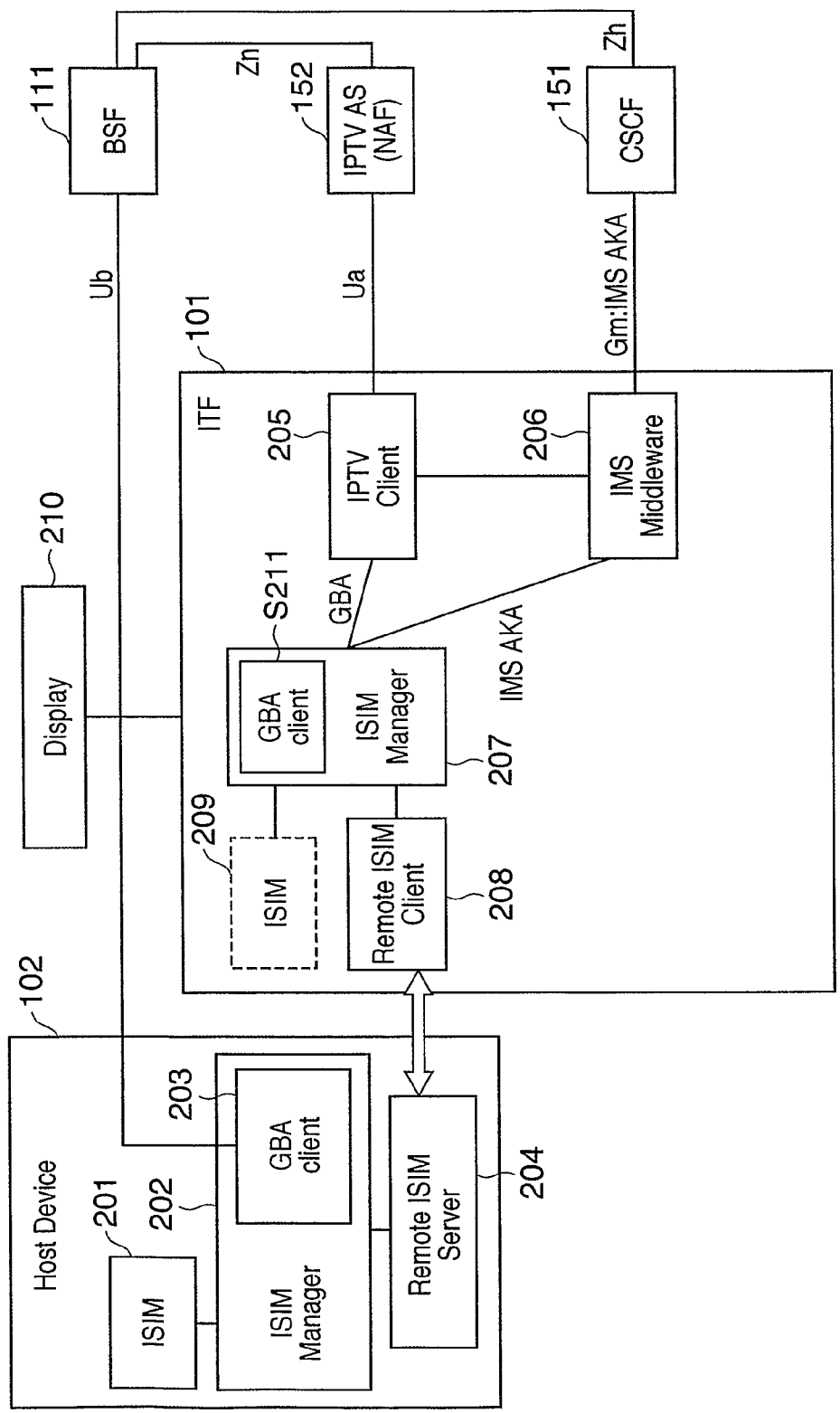
FIG. 2 is a schematic block diagram illustrating configurations of the IPTV Terminal Function (ITF) and the host device according to the embodiments of the present invention.

FIG. 2 is a schematic block diagram illustrating configurations of the ITF 101 and the host device 102. Note that each block in the ITF 101 and the host device 102 may be implemented using dedicated hardware, software executed by a processor (not shown) or a combination thereof.

Figure 3:
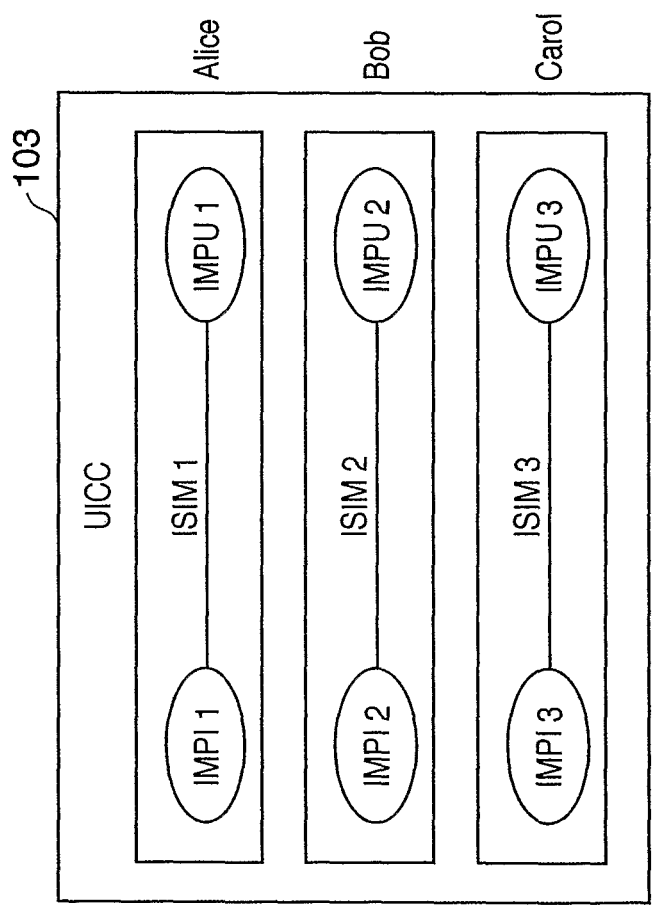
FIG. 3 schematically shows a Universal Integrated Circuit Card (UICC) that stores a plurality of IP Multimedia Subsystem (IMS) Subscribe Identity Modules (ISIMs)

The host device 102 comprises an ISIM 201, which is stored in the UICC 103 (not shown in FIG. 2). In the present embodiment, it is assumed that the UICC 103 stores a plurality of ISIMs 201 as shown in FIG. 3, and each ISIM 201 includes one IMPI and one or more IMPUs. This is advantageous because each user can posses one's own ISIM and protect it with one's own Personal Identification Number (PIN). Moreover, each user can individually register with the IMS network by use of one's own ISIM. However, it should be noted that all users might share a single ISIM.

The host device 102 also comprises an ISIM manager 202 that includes a Generic Bootstrapping Architecture (GBA) client 203, and a remote ISIM server 204.

It should be noted that the present embodiment can be applied for both the case where the ISIM 201 supports GBA_U and the case where the ISIM 201 does not support GBA_U but the GBA client 203 supports GBA_ME. GBA_U is a GBA with UICC-based enhancement where the GBA-specific functions are split between the Mobile Equipment (ME) and the UICC. In GBA_U, a master key (Ks) remains in the UICC while only Ks_ext_NAF generated in the UICC is delivered to the ME. On the other hand, in GBA_ME, all GBA-specific functions are carried out in the ME. The UICC is GBA-unaware, that is, a master key (Ks) is delivered to the ME and a NAF-specific key (Ks_NAF) is generated from the Ks in the ME. Note that "Ks_(ext)_NAF" represents Ks_ext_NAF in the context of GBA_U, and Ks_NAF in the context of GBA_ME.

The ITF 101 comprises an IPTV client 205, an IMS middleware 206, an ISIM manager 207 that includes a GBA client 211, and a remote ISIM client 208. Although the ITF 101 may have an ISIM 209, the ITF 101 does not use it in the present embodiment. A display 210, which displays various kinds of information, is connected to the ITF 101.

One role of the ISIM 201 is to generate IMS Authentication and Key Agreement (AKA) credentials (i.e., RES, Ck, and Ik). The IMS middleware 206 performs an IMS registration with the IMS AKA credentials over a Gm interface.

Another role of the ISIM 201 is NAF key derivation. The IPTV client 205 communicates with the IPTV AS 152 over a Ua interface which are made secure with the encryption key "Ks_(ext)_NAF" derived from a master key (i.e., Ks). Ks is shared by the host device 102 and the BSF 111 as a result of the bootstrapping procedures performed by the GBA client 203.

The Ua interface is actually secured by Ks_(ext)_NAF using HTTP Digest authentication with server-certificate-based TLS or Ks_(ext)_NAF-based TLS (i.e., Pre-Shared Key TLS defined in RFC 4279) and so on.

The ISIM manager 202 is equipped with an API that enables access to the ISIM 201. It is not necessary for the ISIM 201 to support GBA_U because the ISIM manager 202 includes a GBA client 203 that supports a Ub interface and GBA_ME.

The remote ISIM server 204 and the remote ISIM client cooperatively allow the ITF 101 to perform remote ISIM access. More specifically, the ISIM manager 207 and the GBA client 211 have similar functionality to that of the ISIM manager 202 and the GBA client 203 respectively. When the ITF 101 is required to access an ISIM, the ISIM manager 207 accesses the ISIM 201 by way of the remote ISIM client 208 and the remote ISIM server 204.

Since the remote ISIM client 208 is placed behind the ISIM manager 207, it is hidden from all the functions of the ITF 101 including the IPTV client 205 and the IMS middleware 206.

This enables transparent ISIM access from their perspective, that is, the IPTV client 205 and the IMS middleware 206 need not be aware of whether the ITF 101 is accessing a local ISIM 209 or a remote ISIM 201.

In the present embodiment, for the following reason, the GBA client 203 but not the GBA client 211 performs the bootstrapping procedures over the Ub interface. If the GBA client 211 runs its Ub interface with support from the remote ISIM 201, information exchange between the ITF 101 and the host device 102 gets complicated. On the other hand, if the GBA client 203 runs a Ub interface, no information need be exchanged between the ITF 101 and the host device 102 for the purpose of the bootstrapping procedures. Moreover, if the host device 102 is also an IMS UE such as an ITF, it needs to keep track of Ks/Bootstrap Transaction Identifier (B-TID) updates which should be also available for local Ua applications residing in the host device 102. In this case, if the host device 102 runs a Ub interface and manages Ks/B-TID by itself, the complexity of information exchange is reduced.

However, it should be noted that the GBA client 211 might perform the bootstrapping procedures over its own Ub interface.

Figure 4:
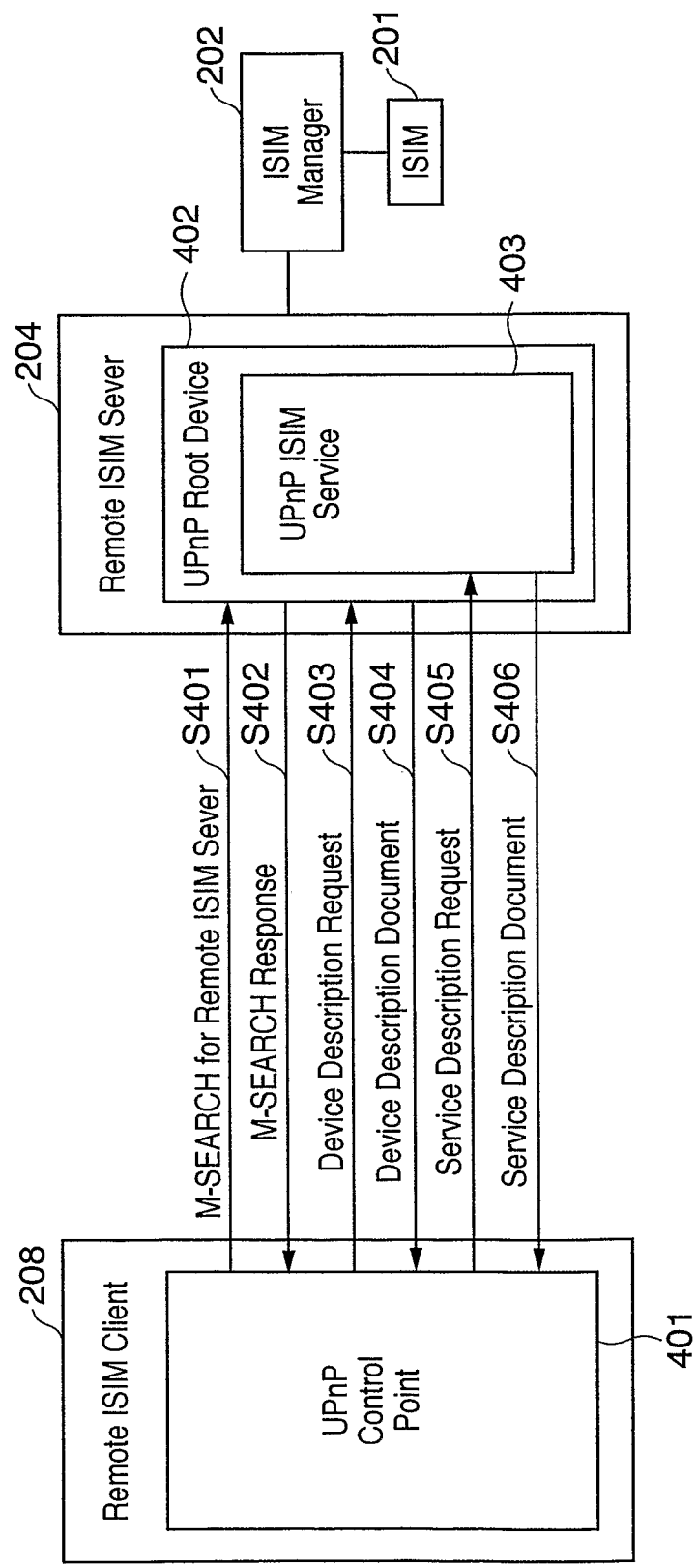
FIG. 4 shows detailed configurations of the remote ISIM client and the remote ISIM server, and the procedures whereby the remote ISIM client discovers the remote ISIM server according to the embodiments of the present invention.
Figure 5:
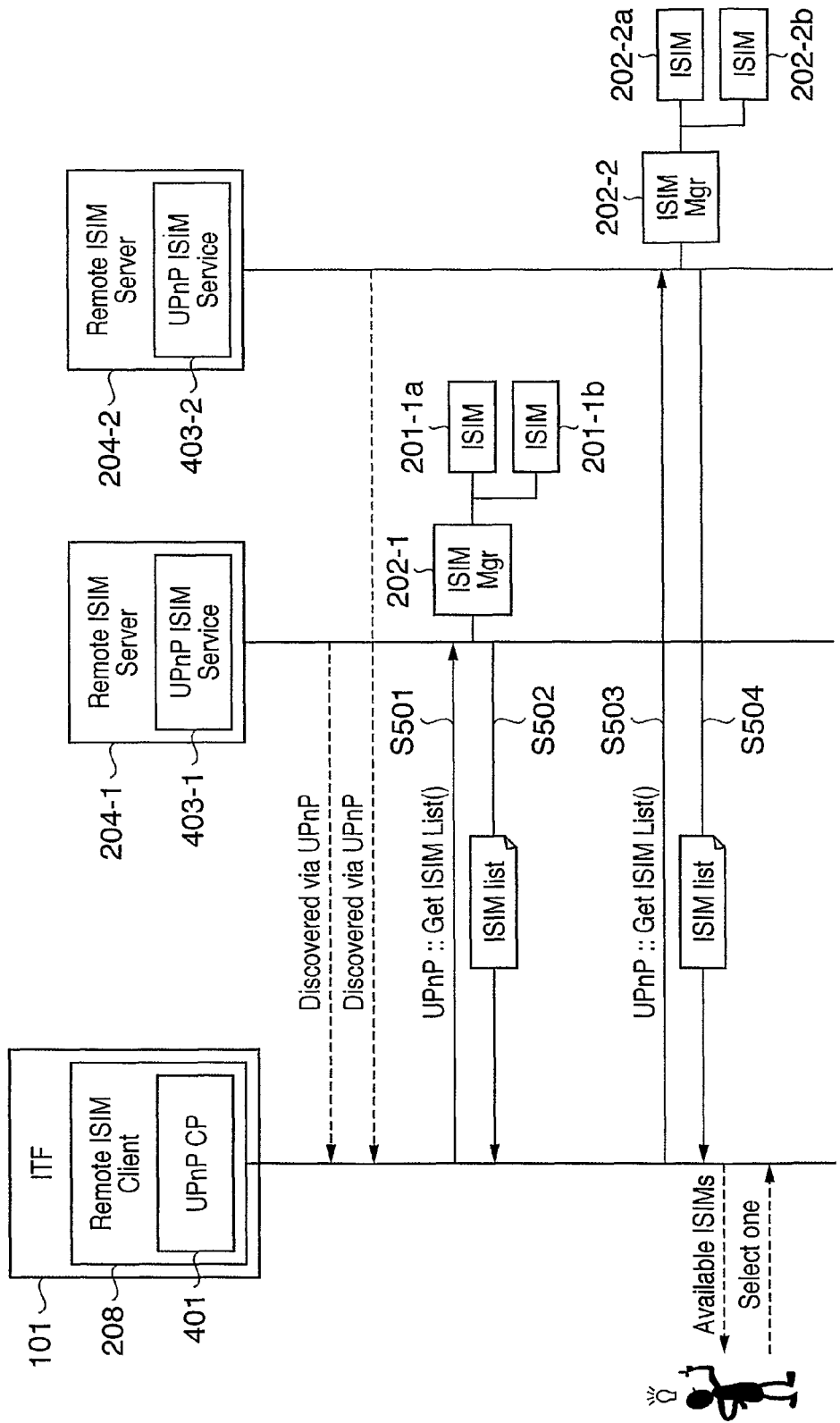
FIG. 5 shows the procedures whereby the remote ISIM client receives the ISIM lists from the discovered remote ISIM servers according to the embodiments of the present invention.
Figure 6:
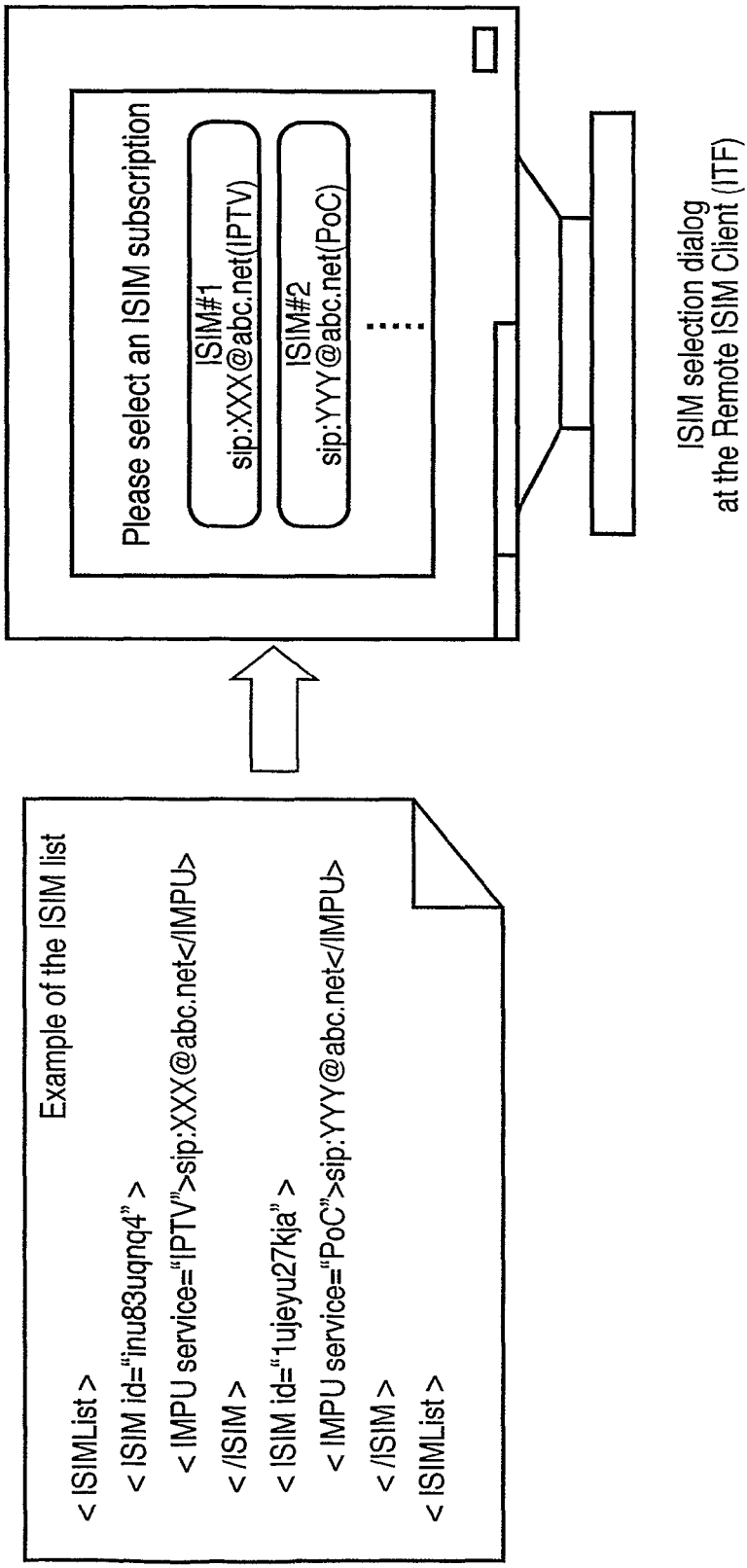
FIG. 6 shows an example of the ISIM list and a screen for ISIM selection.

Referring to FIGS. 4-6, procedures (hereinafter referred to as "discovery process") are described where the ITF 101 finds one or more host devices 102 and selects an ISIM (more precisely, one of the IMPUs of the ISIM) maintained by the discovered host device(s) 102 to receive a specific IMS-based service.

As shown in FIG. 4, the remote ISIM client 208 comprises a UPnP control point (CP) 401, and the remote ISIM server 204 comprises a UPnP root device 402 that includes a UPnP ISIM service 403, which is a kind of a UPnP service. Since the remote ISIM server 204 has access to the ISIM manager 202, the UPnP ISIM service 403 can indirectly expose the ISIM 201 via UPnP scheme.

In order to obtain the IMS subscription information, the remote ISIM client 208 of the ITF 101 searches the home network 100, which is the UPnP network, for the remote ISIM server 204 of the host device 102 as follows. Note that there may be more than one host device 102 in the home network 100, and in this case, more than one remote ISIM server 204 may be discovered.

In steps S401-S406, the UPnP CP 401 performs the standard UPnP discovery procedure. The service type to discover is set to a defined service identifier in the form of Uniform Resource Name (URN) for the UPnP ISIM service 403.

In the present embodiment, a UPnP action "Get ISIM List ( )" is defined and exposed by the UPnP ISIM service 403 so that the user can see available ISIM applications behind the remote ISIM server 204. As shown in FIG. 5, the UPnP CP 401 sends this action request to all discovered UPnP ISIM services 403 (steps S501 and S503), and, in response, receives a list (ISIM list) of ISIMs maintained by respective host devices 102 (steps S502 and S504).

An example of the ISIM list is text data encoded by XML as shown in FIG. 6. Each ISIM instance in the ISIM list is identifiable by a persistent identity (ISIM-ID) (e.g., a hash value of IMPI and all IMPUs) assigned by the UPnP ISIM service 403. The ISIM list contains at least one IMPU and its associated service name(s) such as Push to talk over Cellular (PoC), IPTV, and the like. Originally, the ISIM application itself does not contain any information about services associated with each IMPU; however, it is useful to include such service name information in the ISIM list because doing so allows the user to correctly select a specific IMPU associated with the desired service subscription.

For this purpose, the host device 102 according to the present embodiment supports the following mechanism: the ISIM manager 202 downloads service profiles in advance per ISIM from HSS. This download can be performed via the standard Ut interface. The service profile contains information regarding which IMPU is associated with which IMS-based service, which allows the ISIM manager 202 to create mapping information per ISIM that maintains which IMPU is associated with which service. Based on this information, the remote ISIM server 204 creates the ISIM list containing a service name associated with each IMPU as shown in FIG. 6.

The ITF shows the content of the ISIM list on the display 210 as shown in FIG. 6. In this case, the service name associated with the IMPU serves as a hint for the user to select their desired IMPU. The user selects an ISIM from the ISIM list and further selects an IMPU within the selected ISIM (if the ISIM contains more than one IMPU). The ITF 101 registers with the IMS network 150 using the selected IMS subscription information (i.e., the selected IMPU, the IMPI of the selected ISIM, and so on).

Referring to FIGS. 7-10, procedures (hereinafter referred to as "paring process") are described where the remote ISIM client 208 establishes a secure association (SA) with the remote ISIM server 204.

Once the user selects an ISIM from the ISIM list, the remote ISIM client 208 first verifies if the user can be authenticated to use the selected ISIM. The user authentication is based on PIN as an ISIM supports a built-in PIN-based user authentication.

Figure 7:
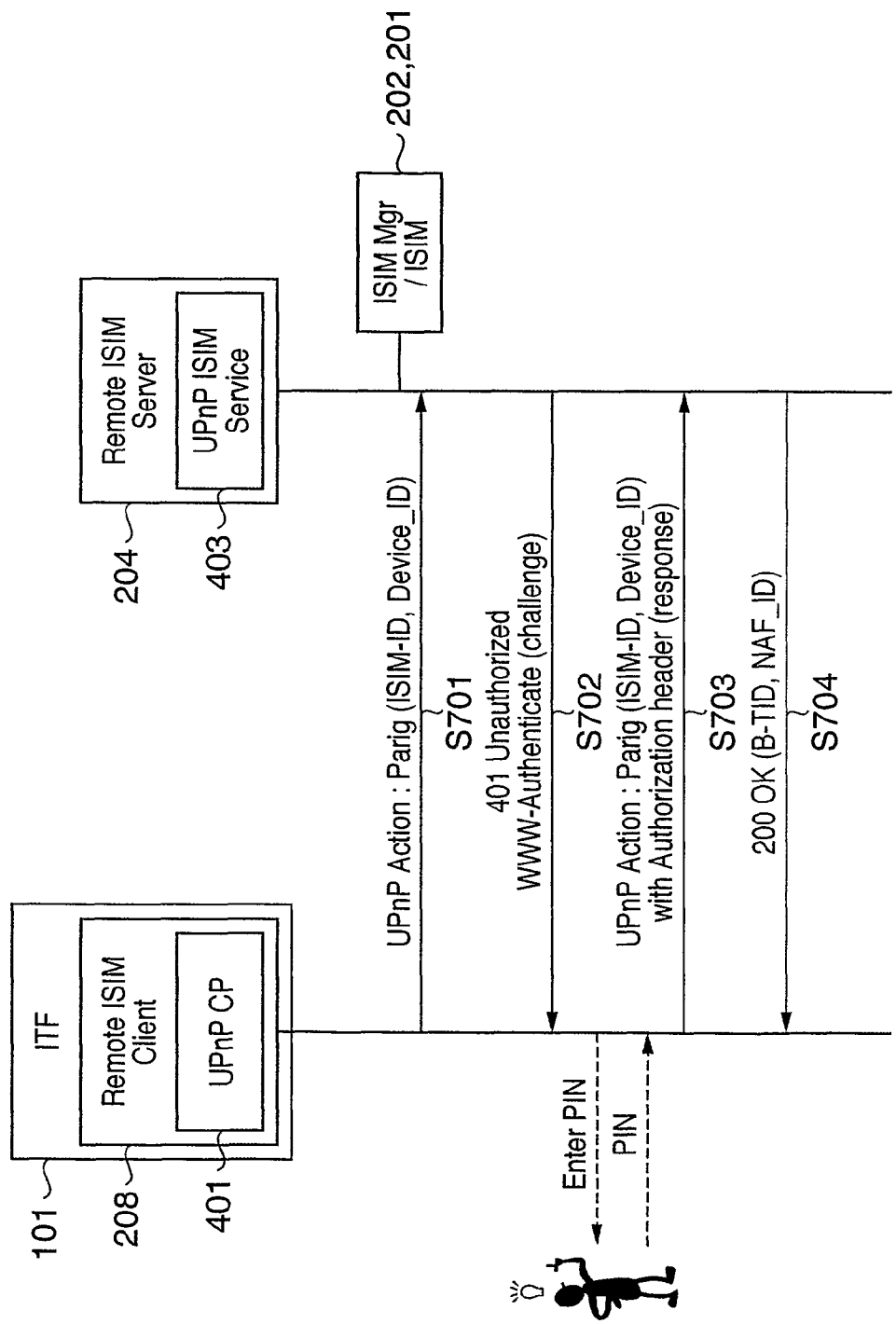
FIG. 7 shows the flow of the HTTP Digest-based authentication between the UPnP Control Point (CP) and the UPnP ISIM service according to the embodiments of the present invention.

In order to implement a protocol to support the PIN-based authentication, a UPnP action request "Paring ( )" is defined. This action request is accompanied with an ISIM-ID as an argument, which is obtained from the ISIM list. The action request and response messages carry relevant HTTP Digest header fields so that the PIN-based authentication is performed based on HTTP Digest. HTTP Digest-based authentication can be performed because the UPnP technology is an HTTP-based technology. FIG. 7 shows the flow of the HTTP Digest-based authentication.

In step S701, the UPnP CP 401 sends the UPnP action request "Paring (ISIM-ID, Device_ID)" to the UPnP ISIM service 403. In the present embodiment, the UPnP action request contains the Device_ID in addition to the ISIM-ID. The Device_ID is used for key establishment (described later in detail with reference to FIG. 10).

In step S702, the UPnP ISIM service 403 returns a 401 Unauthorized response that includes a challenge to the UPnP CP 401. After receiving the 401 Unauthorized response, the UPnP CP 401 prompts the user to input the PIN of the selected ISIM 201 via, for example, the display 210, and receives the input PIN.

In step S703, the UPnP CP sends the UPnP action request "Paring (ISIM-ID, Device_ID)" to the UPnP ISIM service 403 again, but this time it includes a response derived from the PIN.

In step S704, the UPnP ISIM service 403 verifies the response and returns a 200 OK response, which indicates successful user authentication, to the UPnP CP 401. The 200 OK response includes B-TID and NAF_ID, which are used for key establishment (described later in detail with reference to FIG. 10).

Figure 8:
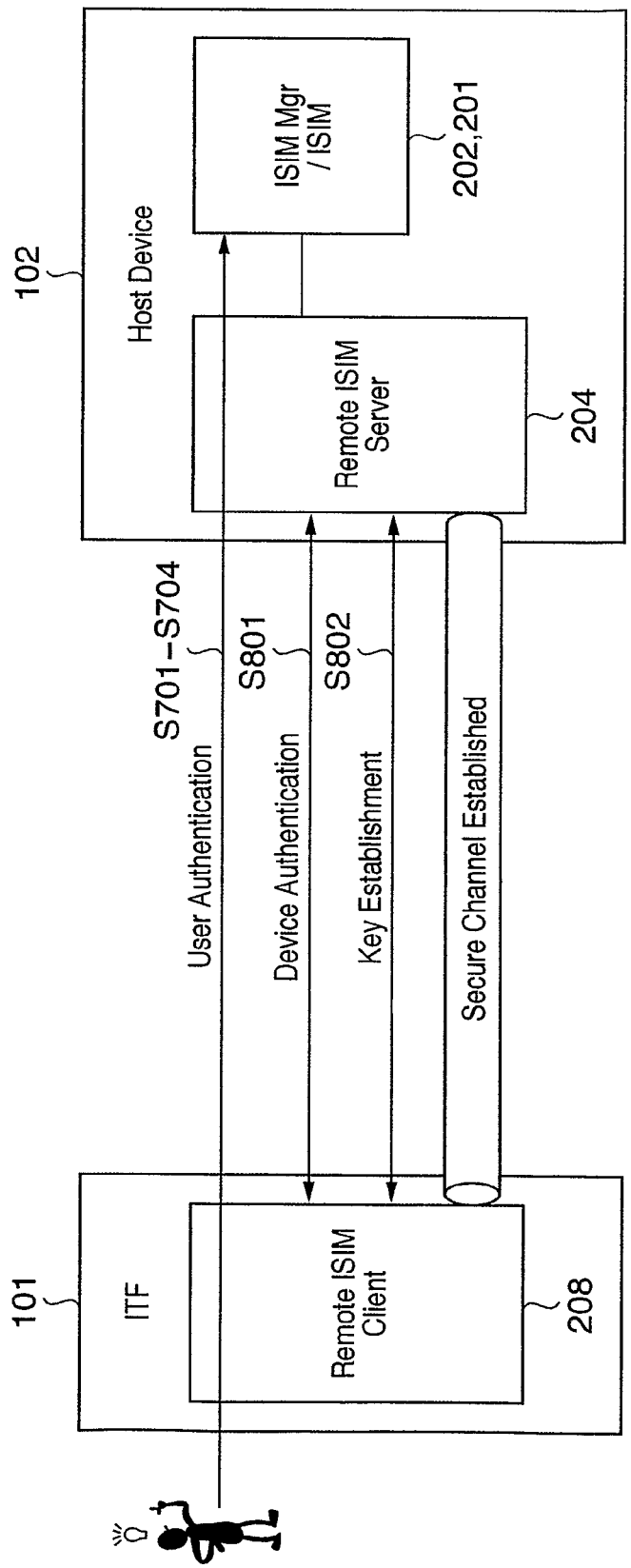
FIG. 8 shows an overview of the device authentication and the key establishment according to the embodiments of the present invention.

After successful user authentication, device authentication and key establishment are performed as shown in FIG. 8.

In step S801, the remote ISIM server 204 verifies that the remote ISIM client 208 is "trusted", and vice versa.

In step S802, the remote ISIM client 208 and the remote ISIM server 204 establishes an encryption key between them.

After that, a secure transmission channel (e.g., a Transport Layer Security (TLS) session) is set up between them using the established key. Therefore, according to the present embodiment, successful pairing results in establishment of a TLS session between the remote ISIM client 208 and the remote ISIM server 204.

According to the present embodiment, the remote ISIM client 208 and the remote ISIM server 204 perform the device authentication and key establishment based on a mechanism defined by 3GPP. Using this mechanism, a shared secret key (called "Ks_local_device") is established between the remote ISIM client 208 and the remote ISIM server 204. Then, the remote ISIM client 208 and the remote ISIM server 204 establish the TLS session using the established Ks_local_device.

Figure 9:
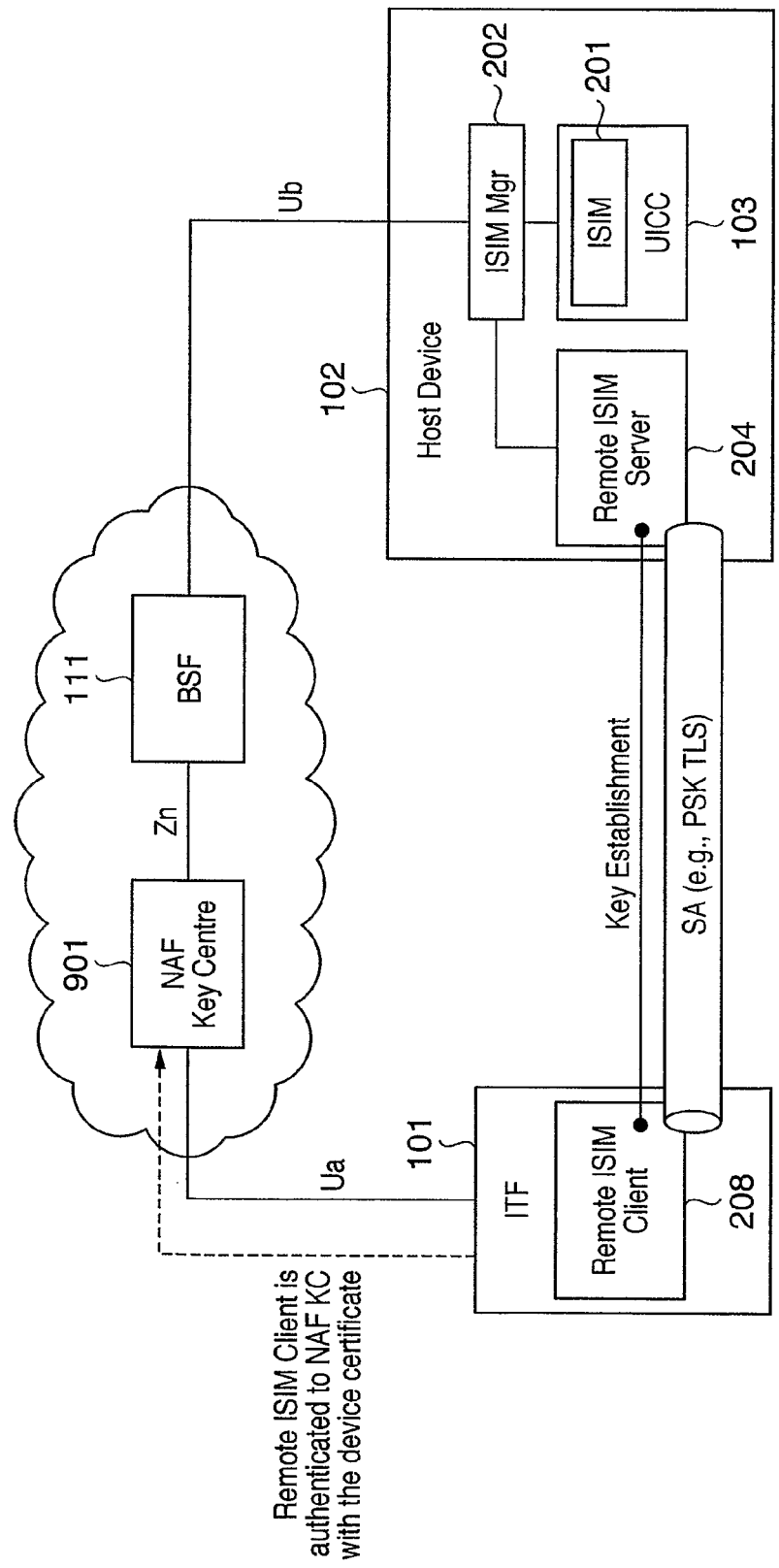
FIG. 9 schematically shows the device authentication and key establishment mechanisms between the remote ISIM client and the remote ISIM server according to the embodiments of the present invention.

Overview of the device authentication and key establishment mechanisms are described with reference to FIG. 9.

After the PIN-based user authentication using HTTP Digest (see FIG. 7), the remote ISIM client 208 establishes an HTTPS session to a NAF Key Centre 901. In this case, the remote ISIM client 208 is authenticated to the NAF Key Centre 901 with its device certificate. Then, the remote ISIM client 208 receives Ks_local_device, which is shared with the host device 102, from the NAF Key Centre 901. In this sense, the NAF Key Centre 901 is virtually acting as an operator's authentication center to verify that the IMS UE such as the ITF 101 is trusted. This mechanism also brings the following benefits for the operator:

- Dynamic device authorization is possible. In other words, with the NAF Key Centre 901, the operator can determine which IMS UE is authorized to perform the remote ISIM access to which remote ISIM (i.e., ISIM maintained by the host device) based on its policies.
- Tracking and logging of all the remote ISIM access is possible for the operator, which facilitates, for example, charging of the user.

As described above, the remote ISIM client 208 is authenticated to the NAF Key Centre 901 with its device certificate. On the other hand, the remote ISIM client 208 can authenticate the remote ISIM server 204 during the TLS handshake based on the established Ks_local_device because the remote ISIM server 204 can generate that shared secret (i.e., Ks_local_device) only when it is legitimate. Accordingly, the remote ISIM server 204 does not need to have a device certificate in order for the remote ISIM client 208 to authenticate the remote ISIM server 204.

Figure 10:
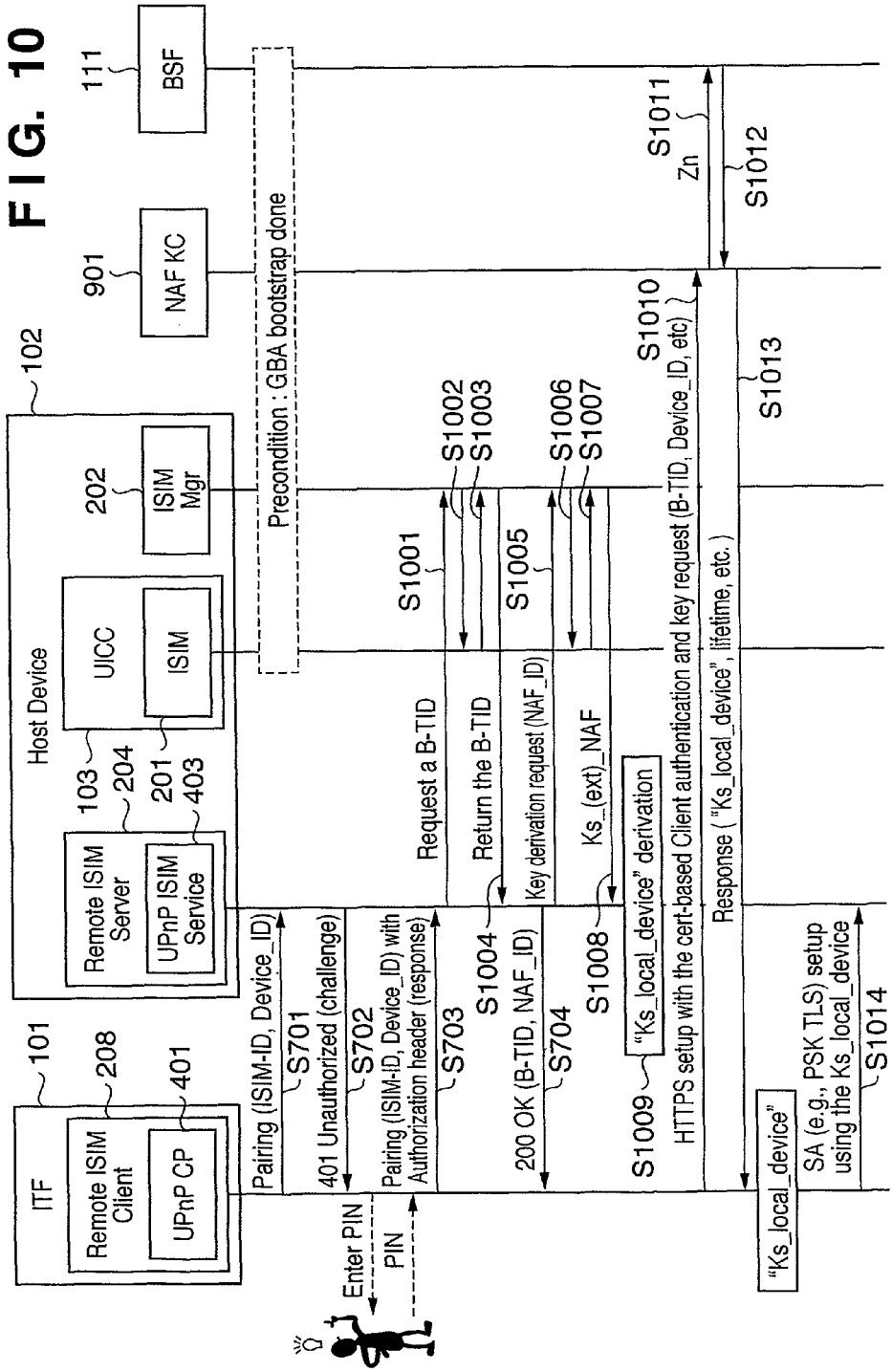
FIG. 10 shows the procedures whereby the remote ISIM client establishes a secure association (SA) with the remote ISIM server according to the embodiments of the present invention.

FIG. 10 shows the flow of the paring process. As described above, the paring process starts when the UPnP CP 401 sends the UPnP action request "Pairing ( )" to the UPnP ISIM service 403. The action request contains the ISIM-ID and a Device_ID of the remote ISIM client 208. A Device_ID is required by the remote ISIM server 204 in order to derive a Ks_local_device as described in connection with step S1009.

After step S703, in step S1001, the remote ISIM server 204 requests a B-TID from the ISIM manager 202.

In steps S1002-S1003, the ISIM manager 202 retrieves the B-TID from the ISIM 201. In the case of GBA_ME, these steps are not necessary because the ISIM manager 202 maintains the B-TID.

In step S1004, the ISIM manager 202 returns the B-TID to the remote ISIM server 204.

In step S704, the UPnP ISIM service 403 returns a 200 OK response to the remote ISIM client 208. The response includes the B-TID together with the NAF_ID of the NAF Key Centre 901. Note that the NAF_ID may be configured in the remote ISIM server 204 in advance.

In steps S1005-S1008, the remote ISIM server 204 retrieves Ks_(ext)_NAF from the ISIM manager 202. Note that in steps S1006-S1007, the ISIM manager 202 retrieves Ks_ext_NAF from the ISIM 201 in the case of GBA_U, whereas the ISIM manager 202 retrieves the Ck and Ik from the ISIM 201 and calculates Ks_NAF in the case of GBA_ME.

In step S1009, the remote ISIM server 204 derives Ks_local_device based on the B-TID, the NAF_ID, Ks_(ext)_NAF, and Device_ID.

In steps S1010-S1013, as described with reference to FIG. 8, the remote ISIM client 208 establishes an HTTPS session with the NAF Key Centre 901 using its device certificate, and retrieves Ks_local_device from the NAF Key Centre 901.

Finally, in step S1014, the remote ISIM client 208 establishes a Pre-Shared Key (PSK) TLS session with the remote ISIM server 204 using a pre-shared encryption key (i.e., Ks_local_device), and the paring process completes.

In some embodiments, the ITF 101 may create a "user ISIM profile" after the user authentication (see steps S701-S704 of FIG. 10). With the user ISIM profile, the ITF 101 can omit the discovery process and a part of the paring process the next time it accesses the target remote ISIM. The user ISIM profile may be created and maintained by the remote ISIM client 208 after the procedure of step S704 (not shown).

The user can name the user ISIM profile a user-friendly name such as "Alice" or "Bob". Using the user-friendly name, the user can easily choose one's user ISIM profile out of many profiles maintained by the remote ISIM client 208.

The user ISIM profile contains:
The Control URL of the UPnP ISIM service 403
The ISIM-ID
The PIN code In the course of the user ISIM profile creation, the remote ISIM client 208 may prompt the user to set a password for the user ISIM profile in order to prevent misuse of the user ISIM profile by another person. Alternatively, a user may select another option whereby the PIN code for the target remote ISIM is not contained within the user ISIM profile. In this case, the user is required to input the PIN every time the pairing process is performed.

Figure 11:
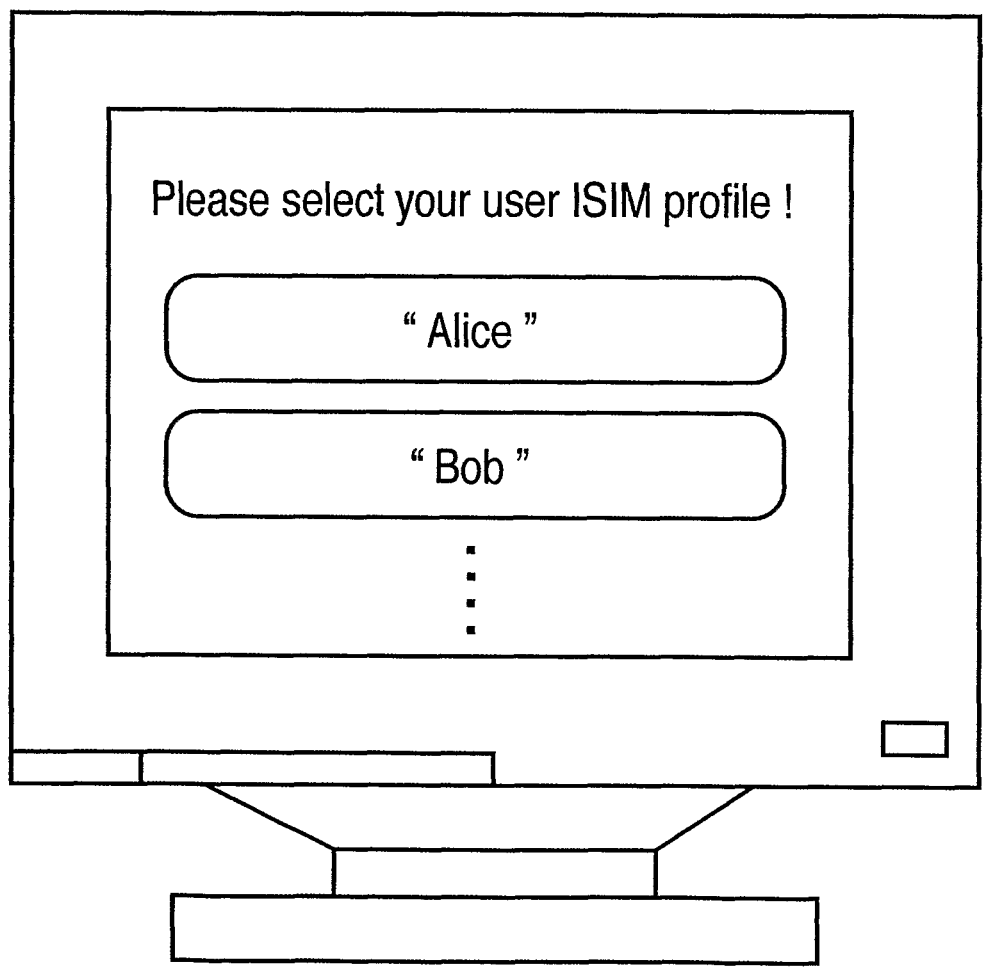
FIG. 11 shows a selection screen with which the user selects the user ISIM profile according to the embodiments of the present invention.

In the case that the user ISIM profile has been created by the remote ISIM client 208, when the user wishes to access the IMS network 150 by use of the ITF 101, the user selects their ISIM profile via a selection screen such as one shown in FIG. 11.

Since the PIN is contained in the user ISIM profile, it is not necessary for the user to input the PIN between steps S702 and S703 of FIG. 10. In step S703, the remote ISIM client 208 retrieves the PIN from the user ISIM profile, derives the response based on the extracted PIN, and sends an action request that includes the response to the remote ISIM server 204.

In some embodiments, a UPnP request action "User Authentication ( )" may be implemented in the UPnP CP 401 and the UPnP ISIM service 403. "User Authentication ( )" is different from "Paring ( )" in that the UPnP CP 401 and the UPnP ISIM service 403 do not initiate the paring process; they only perform user authentication for the purpose of the creation of the user ISIM profile. In this case, the remote ISIM server 204 does not perform the procedures of steps S1001-S1004 in FIG. 10. After step S704, the remote ISIM client 208 creates the user ISIM profile, and terminates the flow of FIG. 10.

Figure 12:
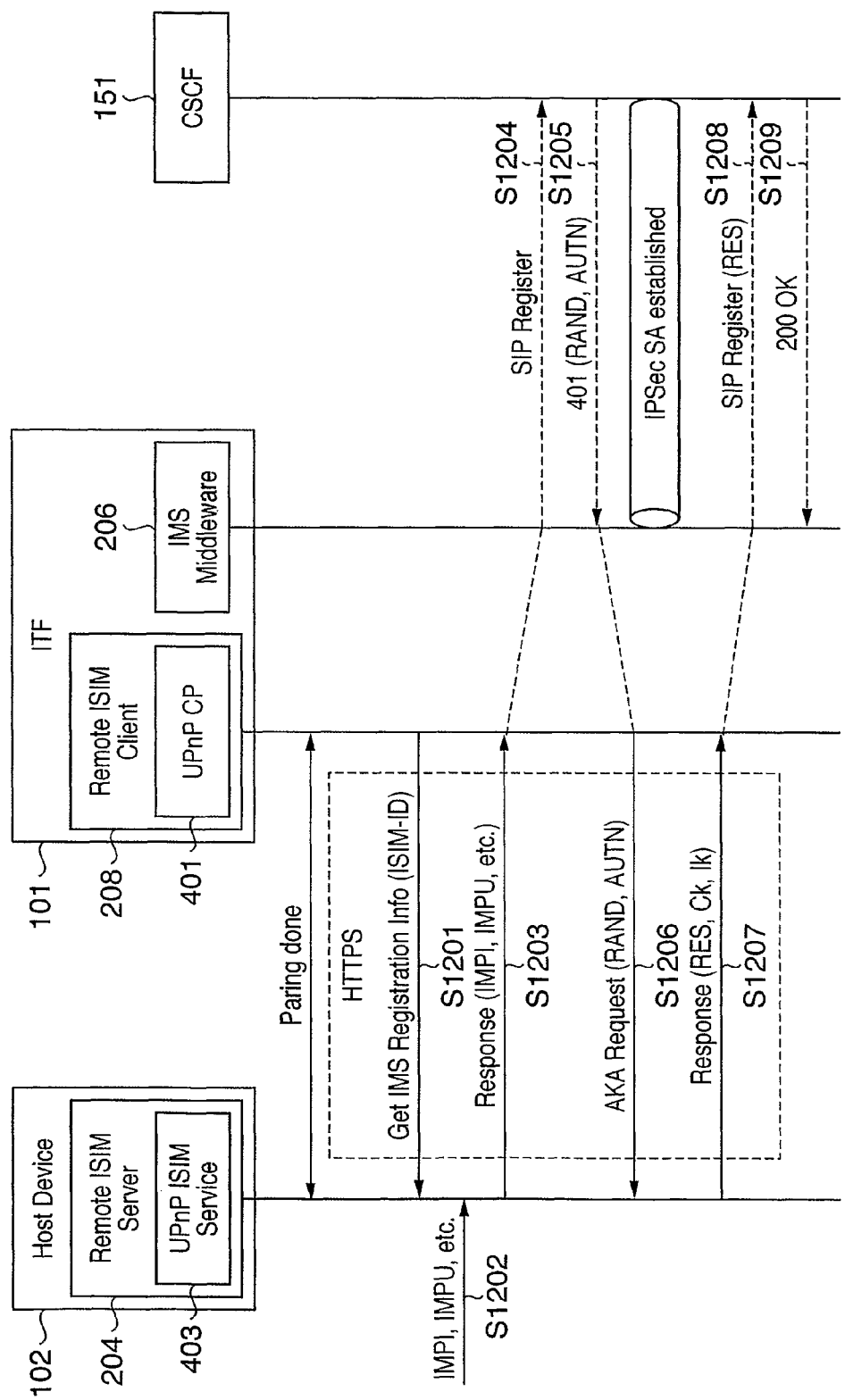
FIG. 12 shows the procedures whereby the ITF performs an IMS registration with an IMS network according to the embodiments of the present invention.

Referring to FIG. 12, procedures (hereinafter referred to as "registration process") are described where the ITF 101 performs an IMS registration with the IMS network 150. The registration process is performed after the successful paring (see step S1014 of FIG. 10).

According to the present embodiment, two UPnP action requests named "Get IMS Registration Info ( )" and "AKA Request ( )" are defined. The action requests and responses are protected by the TLS session established in step S1014.

In steps S1201-S1203, the UPnP CP 401 sends "Get IMS Registration Info (ISIM-ID)" to the UPnP ISIM service 403. The remote ISIM server retrieves, from the ISIM 201 by way of the ISIM manager 202, IMS subscription information necessary for the ITF 101 to send an initial SIP Register request, which includes IMPI, IMPU, P-CSCF address, Home Domain URI, and the like. Then, the UPnP ISIM service 403 returns the IMS subscription information to the UPnP CP 401. If more than one IMPU is returned from the UPnP ISIM service 403, the user is required to select one IMPU to be registered before the next step. Alternatively, if one of the IMPUs has already been selected via the screen shown in FIG. 6, the flow may proceed to the next step without user selection.

In steps S1204-S1205, the IMS middleware 206 sends an initial SIP Register request to the CSCF 151 using the SIP subscription information. It then receives a 401 Unauthorized response including a random challenge (RAND) and a network authentication token (AUTN) from the CSCF 151.

In steps S1206-S1207, the UPnP CP 401 invokes an "AKA Request ( )" action with arguments: the RAND and AUTN. The remote ISIM server 204 inputs the RAND and AUTN to the ISIM 201 via the ISIM manager 202 to obtain RES, Ck, and Ik, which are eventually sent back to the UPnP CP 401.

In steps S1208-S1209, the IMS middleware 206 establishes an IPSec channel toward the CSCF 151 using the Ck and Ik, and re-sends a SIP Register request containing the RES to the CSCF 151, which results in successful IMS registration.

According to the present embodiment, before the IPTV client 205 starts receiving content from the IPTV AS 152, it retrieves a Ks_(ext)_NAF from the hosting device 102 in order to perform encrypted communication with the IPTV AS 152.

Figure 13:
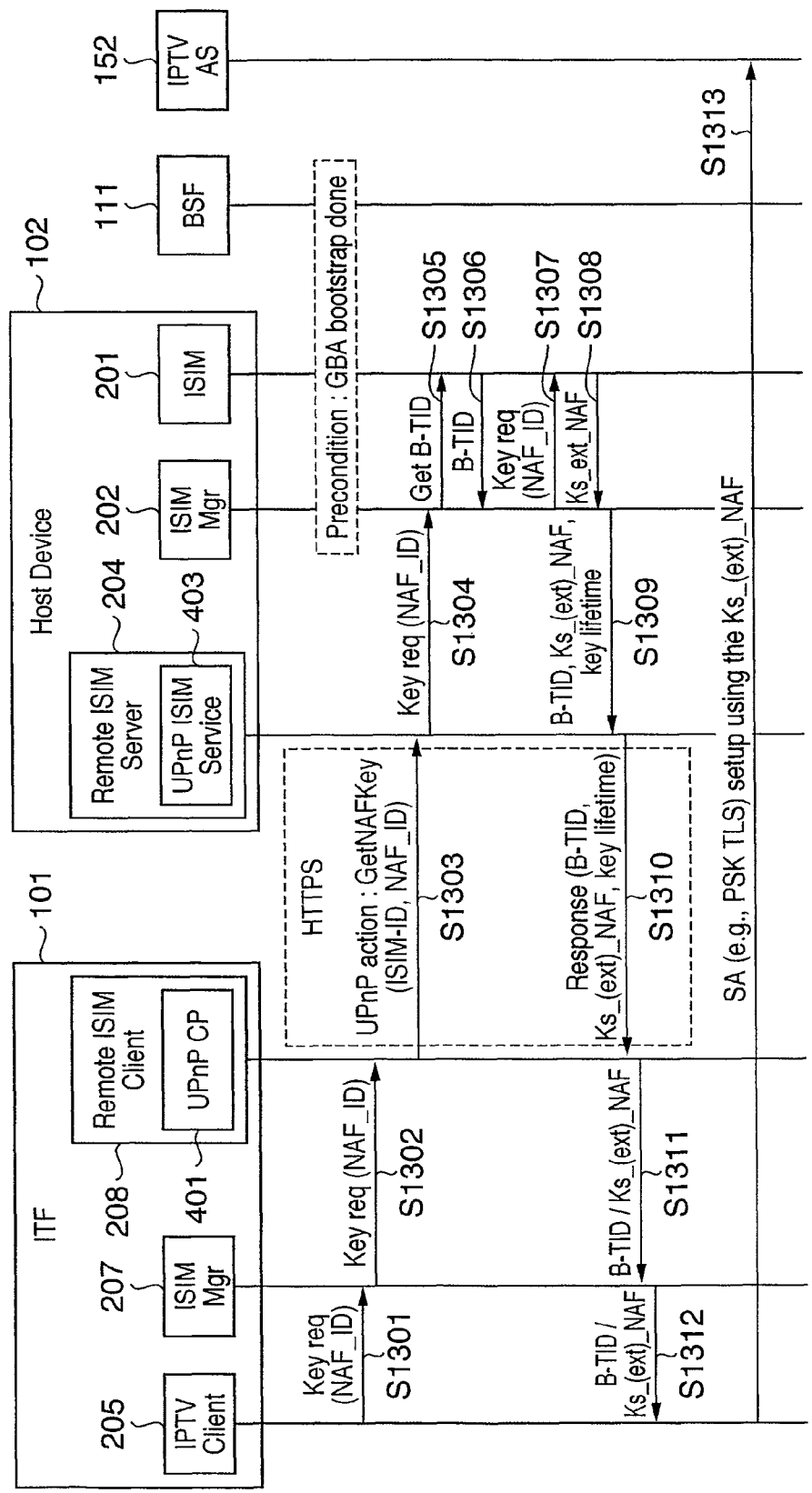
FIG. 13 shows the procedures whereby the IPTV client retrieves Ks_(ext)_NAF from the hosting device according to the embodiments of the present invention.

FIG. 13 shows procedures whereby the IPTV client 205 retrieves Ks_(ext)_NAF from the hosting device 102. For this purpose, an UPnP action request "Get NAF Key ( )" is defined.

In steps S1301-S1302, the IPTV client 205 sends a key request that includes NAF_ID of the target IMS AS (i.e., the IPTV AS 152) to the remote ISIM client 208 by way of the ISIM manager 207.

In step S1303, the UPnP CP 401 sends the action request "Get NAF Key ( )" containing the ISIM-ID and the NAF_ID to the UPnP ISIM service 403.

In steps S1304-S1309, the remote ISIM server 204 retrieves B-TID and Ks_(ext)_NAF from the ISIM manager 202 and the ISIM 201. Note that FIG. 13 depicts the case of GBA_U. In the case of GBA_ME, steps S1305-S1306 are not necessary because the ISIM manager 202 maintains the B-TID. Moreover, in steps S1307-S1308, the ISIM manager 202 retrieves Ck and Ik instead of Ks_ext_NAF from the ISIM 201, and calculates Ks_NAF based on the Ck and Ik.

In step S1310, the UPnP ISIM service 403 returns the B-TID, Ks_(ext)_NAF, and its lifetime to the UPnP CP 401. Note that the communication in steps S1303 and S1310 is performed via the TLS session established as a result of the paring process (see FIG. 10).

In steps S1311-S1312, the IPTV client 205 receives the B-TID and Ks (ext) NAF from the remote ISIM client 208 by way of the ISIM manager 207 as a response to the request of step S1301.

In step S1313, the IPTV client 205 sets up a security association (e.g., PSK TLS session) with the IPTV AS 152 using Ks_(ext)_NAF, thereby performing the encrypted communication with the IPTV AS 152. The IPTV AS 152 obtains the Ks_(ext)_NAF by sending to BSF 111 a key material request containing B-TID received from the IPTV client 205 during negotiating the security association and the NAF_ID. When the BSF 111 receives the key material request, the BSF 111 generates the Ks_(ext)_NAF and returns it to the IPTV AS 152.

In some embodiments, the IPTV AS 152 may implement a smartcard-based service protection such as one known from 3GPP TS 33.246 V7.2.0. Although the terminology defined in 3GPP MBMS (3GPP TS 33.246 V7.2.0) is used here for explanatory purposes, the embodiments are not limited to 3GPP MBMS.

More specifically, the IPTV AS 152 first authenticates the IPTV client 205 with the MBMS Request Key (MRK) while the IPTV client 205 registers to the IPTV AS 152. After successful registration, the IPTV AS 152 encrypts content using an MBMS Traffic Key (MTK), encrypts the MTK using an MBMS Service Key (MSK), and encrypts the MSK using Ks_(ext)_NAF, which corresponds to an MBMS User Key (MUK). Then, the IPTV AS 152 sends the encrypted content to the IPTV client 205. The IPTV AS 152 distributes the encrypted MTK by embedding it into a Multimedia Internet Keying (MIKEY) message while the encrypted content is sent to the IPTV client 205 and also distributes the encrypted MSK using a MIKEY message to the IPTV client 205 after the IPTV client 205 has requested for the MSK or when the IPTV AS 152 decides that it is time to update the MSK.

Figure 14:
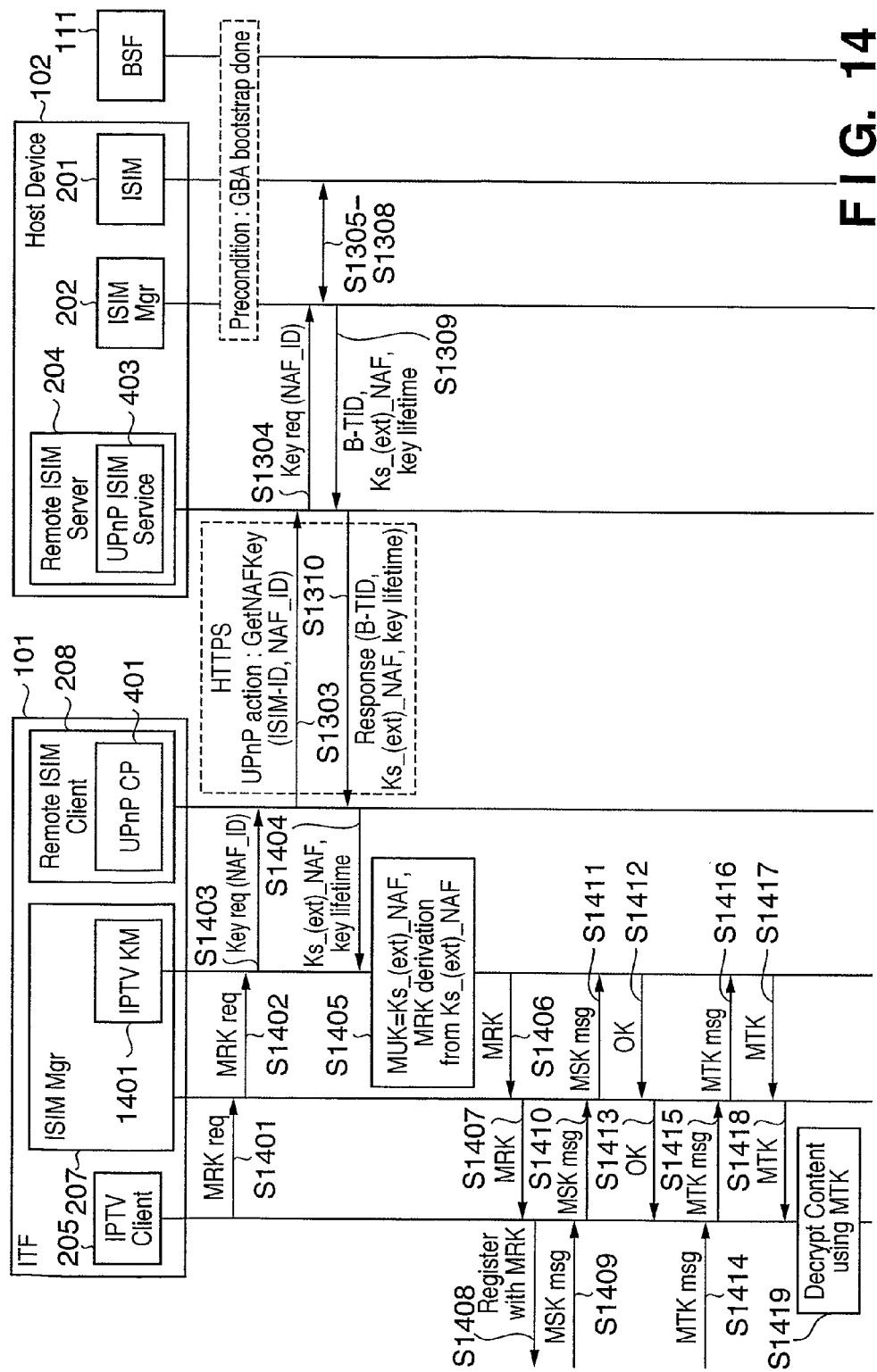
FIG. 14 shows the procedures whereby the IPTV client retrieves the encrypted MTK so that it can decrypt the content according to the embodiments of the present invention.

FIG. 14 shows procedures whereby the IPTV client 205 retrieves the encrypted MTK so that it can decrypt the content. For this purpose, the ISIM manager 207 has an IPTV Key Manager (KM) 1401 as shown in FIG. 14. The IPTV KM 1401 is an entity similar to the MGV-S/F as defined in 3GPP TS 33.246 V7.2.0, thus a person skilled in the art will understand how to implement the IPTV KM 1401 with reference to the description below.

In steps S1401-S1402, the IPTV client 205 sends a MRK request message to the IPTV KM 1401 by way of the ISIM manager 207.

In step S1403, the IPTV KM 1401 sends a key request including the NAF_ID of the target IMS AS (i.e., the IPTV AS 152) to the remote ISIM client 208.

Then, the UPnP CP 401 retrieves the B-TID, Ks_(ext)_NAF, and its lifetime from the UPnP ISIM service 403 in the same manner as described in steps S1303-S1310 of FIG. 13.

In step S1404, the remote ISIM client 208 returns Ks_(ext)_NAF and its lifetime to the IPTV KM 1401.

In step S1405, the IPTV KM 1401 regards Ks_(ext)_NAF as the MUK, and derives the MRK from Ks_(ext)_NAF.

In steps S1406-S1407, the IPTV KM 1401 sends the MRK to the IPTV client 205 by way of the ISIM manager 207.

In step S1408, the IPTV client 205 registers to the IPTV AS 152 in which the IPTV client 205 is authenticated to the IPTV AS 152 with the MRK.

After the registration in step S1408, in steps S1409-S1418, the IPTV client 205 periodically receives the MSK update message and the MTK update message. The IPTV client 205 sends the MSK update message and the MTK update message to the IPTV KM 1401. The IPTV KM 1401 obtains the MSK by decrypting the MSK update message using Ks_(ext)_

NAF, obtains the MTK by decrypting the MTK update message using the MSK, and sends the MTK to the IPTV client 205.

Consequently, in step S1419, the IPTV client 205 can decrypt the encrypted content from the IPTV AS 152 using the MTK.

As described above, according to 3GPP MBMS, various keys are used to enhance the service protection. However, what is important is that the IPTV AS 152 encrypts the content using a given encryption key, which is also encrypted and sent to the IPTV client 205 together with the encrypted content, and the IPTV client 205 can decrypt the given encryption key if the IPTV KM 1401 has Ks_(ext)_NAF. Accordingly, it should be understood that a person skilled in the art should be able to modify (typically, simplify) the procedures of FIG. 14 without departing from the concept of service protection.

ADVANTAGES OF THE INVENTION

The present invention is advantageous in that the user is relieved from the burden of inserting their own UICC into the IMS UE because the IMS UE can dynamically discover an available host device that has IMS subscription information (in other words, an available host device that has ISIM or USIM application) in the UPnP network, and receive IMS-based services by use of the IMS subscription information maintained by the host device. Moreover, it is not necessary for the IMS UE to be equipped with a UICC slot, thus the complexity and cost of the IMS UE can be reduced.

Moreover, the present invention is useful in that the IMS UE can efficiently obtain the encryption key (e.g., Ks_(ext)_NAF) used for encrypted communication in connection with the IMS-based services.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An IP Multimedia Subsystem (IMS) User Equipment (UE), comprising:
   searching circuitry configured for searching, based on Universal Plug and Play (UPnP) technology, a UPnP network for a host device that has a UPnP service configured to provide IMS subscription information and a first encryption key, the first encryption key being shared with an IMS application server (AS) in an IMS network via a Bootstrapping Server Function (BSF);
   establishing circuitry configured for establishing a session with the host device discovered by the searching circuitry;
   subscription retrieving circuitry configured for retrieving, from the UPnP service of the host device via the session, the IMS subscription information;
   registering circuitry configured for registering with the IMS network using the IMS subscription information;
   key retrieving circuitry configured for retrieving, from the UPnP service of the host device via the session, the first encryption key by sending identity of the IMS AS to the host device via the session; and
   communicating circuitry configured for performing encrypted communication with the IMS AS using the first encryption key.

2. The IMS UE according to claim 1, wherein the establishing circuitry:
   receives identity of a key server from the host device;
   receives a second encryption key shared with the host device from the key server; and
   encrypts the session by use of the second encryption key.

3. The IMS UE according to claim 1, wherein the IMS subscription information is maintained in a USIM or ISIM application of the host device.

4. The IMS UE according to claim 1, wherein the IMS AS is an IPTV AS.

5. The IMS UE according to claim 1, wherein the first encryption key is Ks_(ext)_NAF.

6. A method for controlling an IP Multimedia Subsystem (IMS) User Equipment (UE), the method comprising:
   searching, based on Universal Plug and Play (UPnP) technology, a UPnP network for a host device that has a UPnP service configured to provide IMS subscription information and a first encryption key, the first encryption key being shared with an IMS application server (AS) in an IMS network via a Bootstrapping Server Function (BSF);
   establishing a session with the host device discovered by the searching;
   retrieving, from the UPnP service of the host device via the session, the IMS subscription information;
   registering with the IMS network using the IMS subscription information;
   retrieving, from the UPnP service of the host device via the session, the first encryption key by sending identity of the IMS AS to the host device via the session; and
   performing encrypted communication with the IMS AS using the first encryption key.

7. The method according to claim 6, wherein the establishing comprises:
   receiving an identity of a key server from the host device;
   receiving a second encryption key shared with the host device from the key server; and
   encrypting the session using the second encryption key.

8. The method according to claim 6, wherein the IMS subscription information is maintained in a USIM or ISIM application of the host device.

9. The method according to claim 6, wherein the IMS AS is an IPTV AS.

10. The method according to claim 6, wherein the first encryption key is Ks_(ext)_NAF.

11. A host device, comprising:
    establishing circuitry configured for establishing a session with an IP Multimedia Subsystem (IMS) User Equipment (UE) based on Universal Plug and Play (UPnP) technology;
    subscription retrieving circuitry configured for retrieving IMS subscription information from a memory;
    subscription sending circuitry configured for sending, based on UPnP technology, the IMS subscription information to the IMS UE via the session;
    identity receiving circuitry configured for receiving, based on UPnP technology, from the IMS UE via the session, identity of an IMS application server (AS) in an IMS network;
    key retrieving circuitry configured for retrieving a first encryption key based on the identity of the IMS AS, the first encryption key being shared with the IMS AS via a Bootstrapping Server Function (BSF); and
    key sending circuitry configured) for sending, based on UPnP technology, the first encryption key to the IMS UE via the session.

12. The host device according claim 11, wherein the establishing circuitry:

sends identity of a key server to the IMS UE;
calculates a second encryption key shared with the IMS UE based on the identity of the key server; and
encrypts the session by use of the second encryption key.

13. The host device according to claim 11, wherein the IMS subscription information is maintained in a USIM or ISIM application stored in the memory.

14. The host device according to claim 11, wherein the IMS AS is an IPTV AS.

15. The host device according to claim 11, wherein the first encryption key is Ks_(ext)_NAF.

16. A method for controlling a host device, comprising:
establishing a session with an IP Multimedia Subsystem (IMS) User Equipment (UE) based on Universal Plug and Play (UPnP) technology;
retrieving IMS subscription information from a memory;
sending, based on UPnP technology, the IMS subscription information to the IMS UE via the session;
receiving, based on UPnP technology, from the IMS UE via the session, identity of an IMS application server (AS) in an IMS network;
retrieving a first encryption key based on the identity of the IMS AS, the first encryption key being shared with the IMS AS via a Bootstrapping Server Function (BSF); and
sending, based on UPnP technology, the first encryption key to the IMS UE via the session.

17. The method according to claim 16, wherein the establishing comprises:
sending identity of a key server to the IMS UE;
calculating a second encryption key shared with the IMS UE based on the identity of the key server; and
encrypting the session by use of the second encryption key.

18. The method according to claim 16, wherein the IMS subscription information is maintained in a USIM or ISIM application stored in the memory.

19. The method according to claim 16, wherein the IMS AS is an IPTV AS.

20. The method according to claim 16, wherein the first encryption key is Ks_(ext)_NAF.

* * * * *

UNITED STATES PATENT AND TRADEMARK OFFICE
CERTIFICATE OF CORRECTION

| | | |
|---|---|---|
| PATENT NO. | : 8,527,759 B2 | Page 1 of 1 |
| APPLICATION NO. | : 12/989587 | |
| DATED | : September 3, 2013 | |
| INVENTOR(S) | : Murakami et al. | |

It is certified that error appears in the above-identified patent and that said Letters Patent is hereby corrected as shown below:

In the Claims

In Column 14, Line 63, in Claim 11, delete "configured)" and insert -- configured --, therefor.

In Column 14, Line 66, in Claim 12, delete "according" and insert -- according to --, therefor.

Signed and Sealed this
Twenty-fifth Day of March, 2014

Michelle K. Lee
*Deputy Director of the United States Patent and Trademark Office*